United States Patent
Boisvert et al.

[11] Patent Number: 5,952,801
[45] Date of Patent: Sep. 14, 1999

[54] POWER WINDOW OR PANEL CONTROLLER

[75] Inventors: Mario Boisvert; Michel Catudal, both of Reed City, Mich.

[73] Assignee: Nartron Corporation, Reed City, Mich.

[21] Appl. No.: 08/795,971

[22] Filed: Feb. 5, 1997

Related U.S. Application Data

[63] Continuation-in-part of application No. 08/736,786, Oct. 25, 1996, abandoned, which is a continuation of application No. 08/275,107, Jul. 14, 1994, abandoned, which is a continuation-in-part of application No. 07/872,190, Apr. 22, 1992, Pat. No. 5,334,876.

[51] Int. Cl.⁶ .................................................. E05F 15/14
[52] U.S. Cl. .......................................... 318/468; 318/469
[58] Field of Search .................................. 318/469, 466, 318/455, 458, 434, 468, 470, 447, 256, 264, 265, 266, 286; 49/26, 28

[56] References Cited

U.S. PATENT DOCUMENTS

| | | | |
|---|---|---|---|
| 4,514,670 | 4/1985 | Fassel et al. | 318/467 |
| 4,641,067 | 2/1987 | Iizawa et al. | |
| 4,673,848 | 6/1987 | Hagiwara et al. | 318/266 |
| 4,686,598 | 8/1987 | Herr . | |
| 4,730,152 | 3/1988 | Foust et al. | 318/603 |
| 4,746,845 | 5/1988 | Mizuta et al. | |
| 4,823,059 | 4/1989 | Compeau et al. | |
| 4,870,333 | 9/1989 | Itoh et al. | |
| 4,980,618 | 12/1990 | Milnes et al. | |
| 5,038,087 | 8/1991 | Archer et al. | 318/469 |
| 5,069,000 | 12/1991 | Zuckerman . | |
| 5,081,586 | 1/1992 | Barthel et al. | |
| 5,131,506 | 7/1992 | Mizuno et al. | |
| 5,140,316 | 8/1992 | DeLand et al. | |
| 5,162,711 | 11/1992 | Heckler . | |
| 5,204,592 | 4/1993 | Huyer . | |
| 5,218,282 | 6/1993 | Duhame . | |
| 5,278,480 | 1/1994 | Murray . | |
| 5,399,950 | 3/1995 | Lu et al. | |
| 5,432,413 | 7/1995 | Duke et al. | |
| 5,497,326 | 3/1996 | Berland et al. | 364/424.045 |
| 5,729,104 | 3/1998 | Kamishima et al. | 318/446 |
| 5,734,245 | 3/1998 | Terashima et al. | 318/453 |

FOREIGN PATENT DOCUMENTS

| | | |
|---|---|---|
| 581509A1 | 2/1994 | European Pat. Off. . |
| 2502679 | 10/1982 | France . |
| 2189906A | 11/1987 | United Kingdom . |
| WO92/20891 | 11/1992 | WIPO . |

OTHER PUBLICATIONS

Dept. of Transportation, Nat. Highway Traffic Safety Admin., Docket No. 87–10, Federal Register, vol. 56, No. 73, Apr. 16, 1991, pp. 15290–15299.

*Primary Examiner*—Bentsu Ro
*Attorney, Agent, or Firm*—Watts, Hoffmann, Fisher & Heinke Co.

[57] ABSTRACT

A controller for energizing a power window or panel such as a power sunroof. The disclosed controller senses both hard and soft obstructions and de-activates a motor that moves the sunroof when an obstruction is detected. The controller senses obstructions by maintaining data relating to motor operation in three different memory buffers that are periodically updating upon receipt of pulses that are related to motor speed.

26 Claims, 12 Drawing Sheets

POWER WINDOW OR PANEL CONTROLLER

CROSS REFERENCE TO RELATED APPLICATIONS

The present application is a continuation in part of copending U.S. application Ser. No. 08/736,786 to Boisvert et al. which was filed on Oct. 25, 1996, which was a continuation of U.S. application Ser. No. 08/275,107 to Boisvert et al which was filed on Jul. 14, 1994 (abandoned) which is a continuation in part of application Ser. No. 07/872,190 to Washeleski et al, now U.S. Pat. No. 5,334,876. The disclosure of these related applications is incorporated herein by reference.

FIELD OF THE INVENTION

The present invention concerns a control system for use in activating a motor driven window or panel. One example of such a window or panel is a motor vehicle sunroof.

BACKGROUND ART

National Highway Traffic Safety Administration Standard 118 contains regulations to assure safe operation of power operated windows. Standard 118 has been amended to apply to power operated roof panels. It establishes requirements for power window control systems located on the vehicle exterior and for remote control devices. The purpose of the standard is to minimize the risk of personal injury that could result if a limb is caught between a closing power operated window and the window frame. The changes to Standard 118 become effective Sep. 1, 1992. Amended Standard 118 states that the maximum force allowable during an auto closure is to be less than 22 pounds onto a solid cylinder having a diameter of between 4 and 200 millimeters.

Certain problems have been identified with operation of existing power window controls. One problem is an undesirable shutdown of the power window control. It is also desirable to detect a soft obstruction in the window travel path as well as a hard obstruction. The gasket area of the window which avoids water seepage into the vehicle can present a problem to the design of a power window control, since the window or panel encounters different resistance to movement in the gasket region. An additional problem is detection of an obstruction when the motor is first activated.

DISCLOSURE OF THE INVENTION

The present invention provides method and apparatus for controlling operation of motor vehicle power window systems as well as power roof panels.

One embodiment of the invention includes apparatus for activating a motor for moving a window or panel along a travel path and de-activating the motor if an obstacle is encountered by the window or panel. The apparatus includes a sensor for sensing the motor current as the motor moves the window or panel along a travel path. A switch is used for energizing the motor with an energization signal. The apparatus further includes a controller such as for example a programmable controller coupled to the switch means for controllably energizing the motor and more particularly for de-energizing the motor in the event an obstruction is encountered.

The programmable controller monitors motor current from the sensor and performs a comparison between sensed motor current and a prior motor current sensed during a prior period. If the results of this comparison indicate an obstruction has been detected, the controller activates the switch to stop the motor. The obstruction sensing is most preferably based on both motor current and sunroof speed. The sunroof speed is derived from motor commutator pulses whose pulse width depends on the speed at which the motor rotates.

In accordance with a preferred embodiment of the invention a history of both pulse width and motor current is stored in a buffer or memory unit that is maintained by the programmable controller. The buffer is updated with newly acquired data which is accessed and compared to sense an obstruction.

The above and other objects and advantages of the invention will be further described in conjunction with the accompanying drawings.

BEST MODE FOR PRACTICING THE INVENTION

Figure 1A:
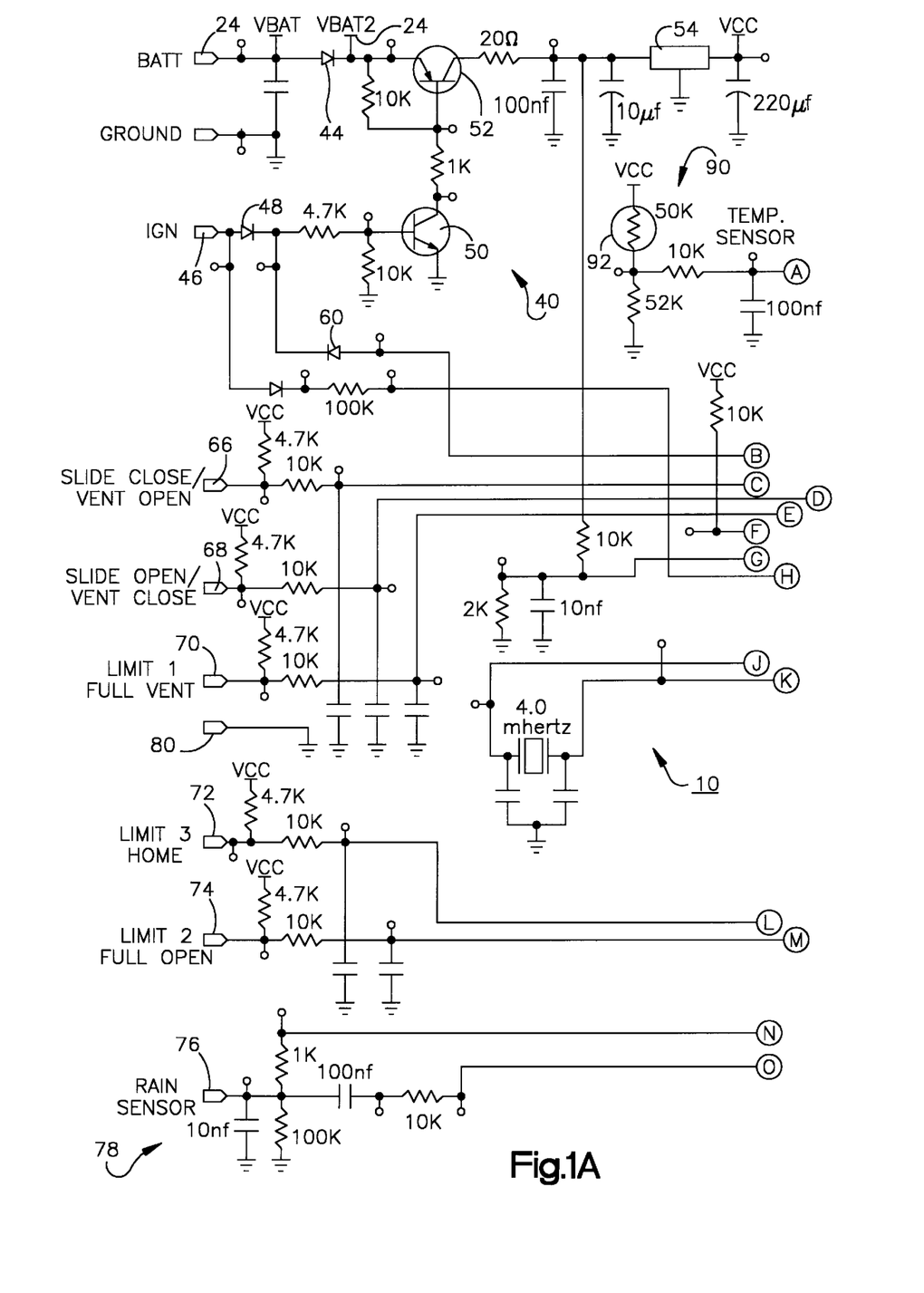
FIGS. 1A and 1B are schematics of a power window or panel control circuit constructed in accordance with the present invention.
Figure 1B:
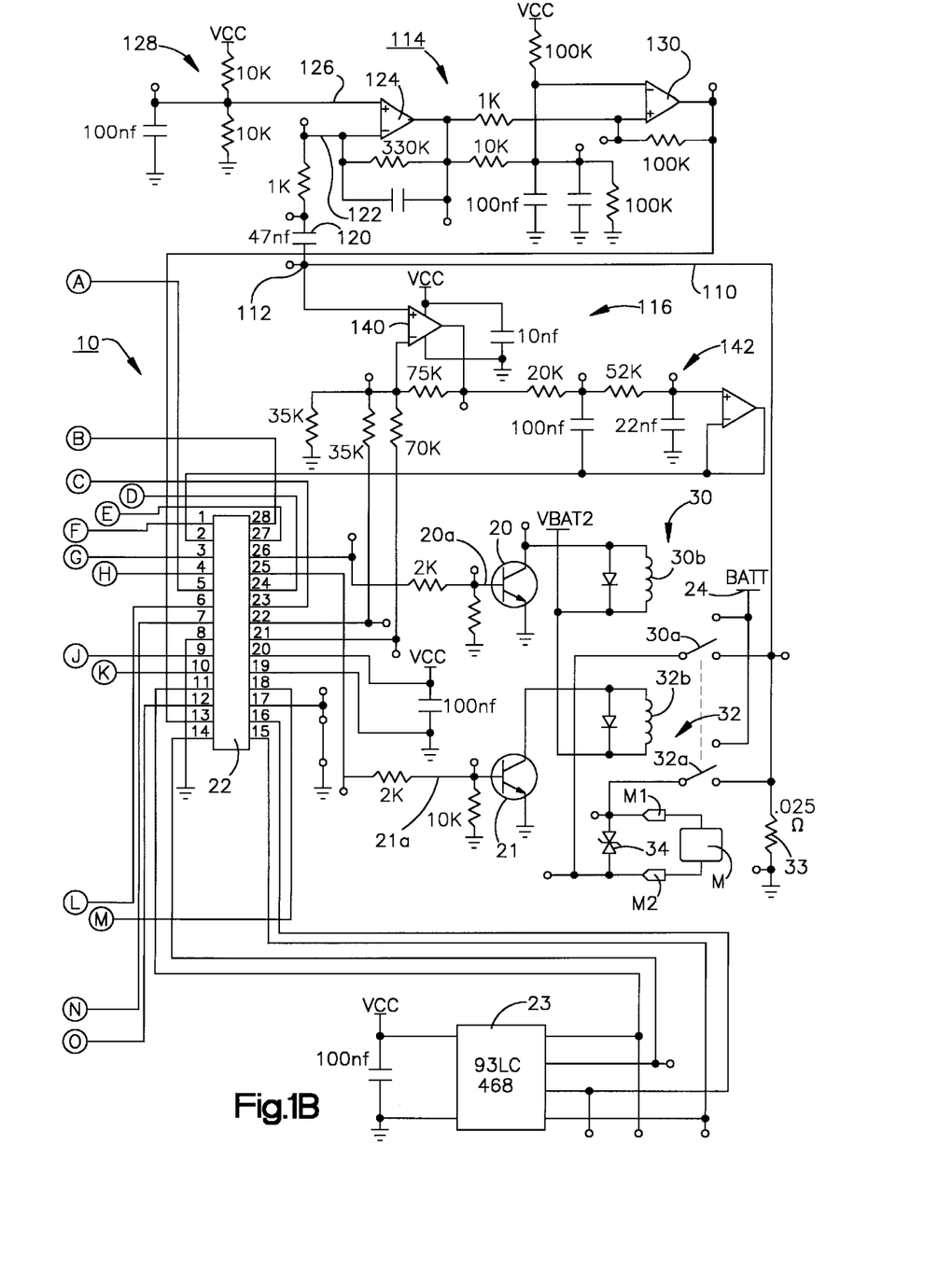

Turning now to the drawings, FIGS. 1A and 1B depict a circuit 10 for activating a direct current (d.c.) motor M having an output shaft coupled to a transmission that moves a window or panel in a motor vehicle. The circuitry disclosed in U.S. Pat. No. 5,334,876 used a pulse width modulation activation of the motor windings of a direct current motor to control the speed of motor output shaft rotation as the motor opens or closes the window or panel. The present system, however, couples the full battery voltage of a motor vehicle across the motor M whenever panel motion is needed.

When used to operate a power sunroof the control circuit 10 can open the sunroof, close the sunroof, and also tilt open the sunroof to a vent position. The preferred embodiment of the invention is used to control a power sunroof but other panels or windows could be actuated using the disclosed control circuit 10 and obstruction detection routines.

Panel movement is accomplished by controlled actuation of the motor M. Two transistors 20, 21 have base inputs 20a, 21a coupled to a microprocessor controller 22. Selectively activating one or the other of the transistors 20, 21 (but not both simultaneously) causes the motor M to move the panel in one or the other direction. Although a microprocessor controller 22 is used in the preferred embodiment of the invention, hard-wired circuitry could be used to implement the disclosed controlled motor energization. A preferred microprocessor 22 is a model PIC16C73A microprocessor commercially available from Microchip which executes an operating system or control program stored within a microprocessor memory. This circuit 10 also includes a separate EEROM memory unit 23 that communicates with the microprocessor 22 for storing constants that are determined during execution of the control program.

Power is applied to the motor M from the motor vehicle battery. As seen in FIG. 1B, a battery input 24 is coupled to the motor M through one of two single pole double throw relays 30, 32 having contacts 30a, 32a. When the contact 30a connects the battery input 24 to one motor input M2, the second motor input M2 is connected through the contact 32a to ground through a small current sensing resistor 33. The motor then rotates in one sense. When the contact 32a connects the battery input 24 to the motor input MI the contact 30a connects the motor connection M2 to the resistor 33 and the motor rotates in an opposite sense.

The position of the contact 30a is controlled by the current through a relay coil 30b. The coil is energized when the transistor 20 is turned on in response from an output from pin 26 of the microprocessor controller 22. Current passing through the coil 30b moves the contact 30a to the battery connection 24. In a similar manner, when the transistor 21 is turned on in response from an output from pin 25 of the microprocessor, the contact 32a connects the other motor connection M1 to the battery. In either instance the non-energized side of the motor M is grounded through a resistor 33.

Power Supply

A power supply 40 (FIG. 1A) supplies a regulated voltage (VCC) for powering the circuit 10. The power supply includes a diode 44 that protects the control circuit 10 from inadvertent reverse battery connection.

An ignition input 46 is used to control the condition of the power supply 40. When the ignition input 46 goes high in response to the motorist movement of the ignition key to either run, start, or accessory position, a high signal is transmitted through a diode 48 to a base input of a transistor 50. This causes a second transistor 52 to conduct which applies the battery voltage from the battery voltage input 24 to a voltage regulator 54. An output from the regulator 54 is a regulated voltage VCC for powering the circuit 10.

The power supply 40 is temporarily latched into operation for a controlled time interval after the ignition signal has been removed when the user switches the ignition off. A diode 60 is connected to an output (pin 4) from the controller 22 and latches the power supply 40 in the on condition. Latching of the power supply allows the circuit 10 to automatically close the power sunroof after the ignition key is turned to an off position. An advantageous feature of activating the power supply 40 and hence the circuit 10 only when the ignition is switched on is to reduce quiescent current consumed by the control circuit 10.

External Inputs

FIG. 1A illustrates multiple inputs that couple additional signals to the circuit 10. These inputs are pulled high by means of a series of pull-up resistors. Additional details concerning one suitable interface for generating this series of inputs is contained in U.S. Pat. No. 5,334,876 to Washeleski et al which is incorporated herein. The input designations on the left of FIG. 1A are active when they are pulled low. The inputs are summarized here and referred to below in describing detailed operation of the control program for the microprocessor controller 22.

A slide close input 66 is a momentary type input activated by the motorist and is used to close the sunroof. If the sunroof is already closed when this input is actuated, the sunroof will move to a vent open position. Momentary actuation causes the controller to enter express mode and continued actuation causes the program to enter manual mode. A slide open input 68 is also a momentary type input and is used to open the sunroof. The open input is also actuated to close the sunroof from a vent position. This input can be controlled in either express or manual mode.

Three additional inputs 70, 72, 74 monitor the status of three possible limit switches. A first input 70 is optionally used to monitor a full vent position of the sunroof. This input 70 is pulled low if the sunroof is moved to the fully opened vent position. A second of the limit switch controlled inputs 72 provides an input when the sunroof reaches its home position, i.e. the sunroof is closed. A third input 74 is optionally used to monitor a fully opened sunroof position, i.e. when the sunroof is slid to a fully opened position this third input 74 is pulled low. The availability of these three inputs 70, 72, 74 depends upon the configuration of the sunroof which can vary between sunroof manufacturers. The operating system software of the programmable controller 22 is changed depending on the availability of these inputs. An additional optional input 76 is used to monitor rain by means of a capacitive sensor 78 that may be used to automatically close the sunroof if rain is sensed. A final input 80 serves as a ground connection for a wiring harness for these inputs.

The present implementation of the invention includes a temperature sensor 90 on a controller printed circuit board. The controller includes a thermistor sensor 92 coupled to an output from the voltage regulator 54. The signal generated by the sensor 90 is related to temperature and coupled to pin 5 of the microprocessor controller 22.

Motor Current Monitoring

In addition to controlling the rotation direction of the motor M by means of the state of the two transistors 20, 21 the microprocessor monitors the motor current from which it determines sunroof position and speed. Returning to FIG. 1B, it is noted that whenever one of the contacts 30a, 32a is connected to the battery input 24 another of the contacts is coupled to the resistor 33 and by means of a conductor 110 to a junction 112 located midway between two sensing circuits 114, 116. A signal transmitted through the conductor 110 originates at the motor M and provides a signal based upon the current through the motor windings.

The junction 112 is capacitively coupled through a capacitor 120 to one input 122 of an operational amplifier 124 configured as a comparator amplifier. A second input 126 is coupled to a resistor network 128 that provides a reference voltage (in the disclosed design about 2.5 volts) to the comparator amplifier. Each time the motor commutates a spike is generated that is transmitted to the junction 112 and through the coupling capacitor 120 to the input 122. A second operational amplifier 130 is used to square up the output waveform from the operational amplifier 124 and is fed back to the microprocessor controller 22. The microprocessor monitors the pulse width or time period between rising edges of the signals at pin 13. These pulses occur at generally regular intervals over the travel path of the panel. For one representative vehicle sunroof there are 3000 pulses from full open to closed position of the sunroof. The pulse width of these signals provides an indication to the microprocessor of the sunroof speed.

The signal at the junction 112 is the instantaneous voltage that is developed across the resistor 33 due to operation of the motor. The junction 112 is also coupled to an input of an operational amplifier 140 configured as an amplifier having an adjustable gain controlled by the microprocessor by controlling outputs on pins 22 and 21. An output from the operational amplifier 140 is filtered by a low pass filter circuit 142 that filters out noise and then connected to the microprocessor (pin 2) to provide an analog voltage signal related to motor current. This voltage is converted to a digital value by the microprocessor. Normal operation of the motor M causes the controller to register a value of between 40 and 80 out of a full range scan of 256 on an arbitrary or unitless digital scale.

Control Operation

The following summarizes the different functions the controller provides in actuating the motor 12. So called manual mode is achieved by the motorist actuating a rocker switch to ground either the open or close input 66, 68 for at least a predetermined interval. When in manual mode the microprocessor 22 activates the motor 12 to move the sunroof in a direction that is requested by the user. The controller 22 removes power to the motor 12 once the sunroof has reached its requested destination.

In a so-called express mode of operation, the motorist may depress the rocker switch to ground one of the open or close inputs for less than a preset time period. This causes the sunroof to begin moving until either the roof has reached its closed or home position, its full open or full vent position, an obstruction is encountered while closing, or the user presses another key to interrupt the express mode selection. If the motorist chooses to stop the movement during the express mode, he or she actuates the rocker switch to ground either of the open or close inputs 66, 68. In a presently preferred use of the invention the inputs are controlled by a rocker switch that pivots away from a center position to ground either the open or close input for a temporary or extended period based upon user control of the rocker switch.

Calibration

Figure 11:
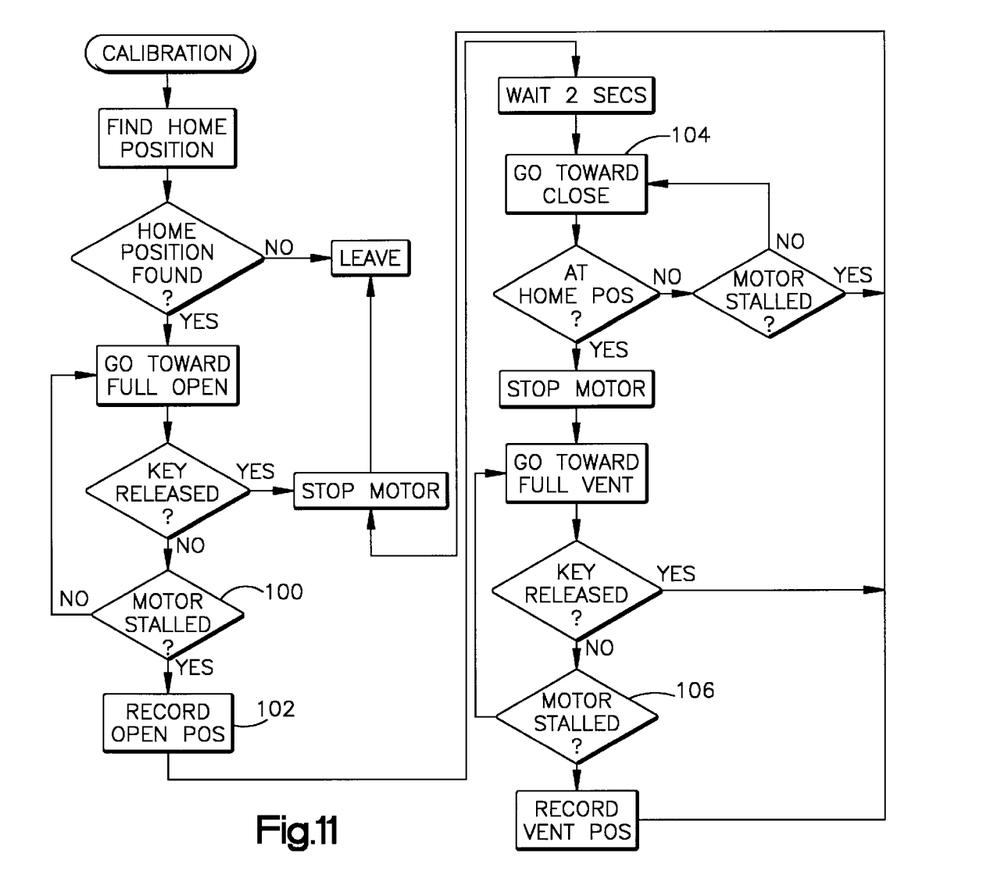

To allow the controller 22 to perform the above functions it must first be calibrated. The calibration step need only be performed the first time power is applied to the circuit 10, or if the physical characteristics of the sunroof change. If calibration has not been performed an express mode movement feature is inhibited. The calibration process is depicted in flowchart form in FIG. 11 of the drawings.

Calibration can be initiated at any time the user feels that the control circuit 10 is not performing as it should and must always be done if either the controller 22 or the sunroof is changed. The size of the roof is recorded in the EEPROM 23 as well as an identification word flag to enable sunroof operation in the express mode. The position of the sunroof is recorded in the EEPROM 23 each time the sunroof is stopped from moving. This is done to guarantee that in the case of a power down, the current position of the sunroof is always known. If at any time the position is considered to be unknown, the express mode is disabled until the next time the sunroof is moved to the fully closed or home position.

Figure 12:
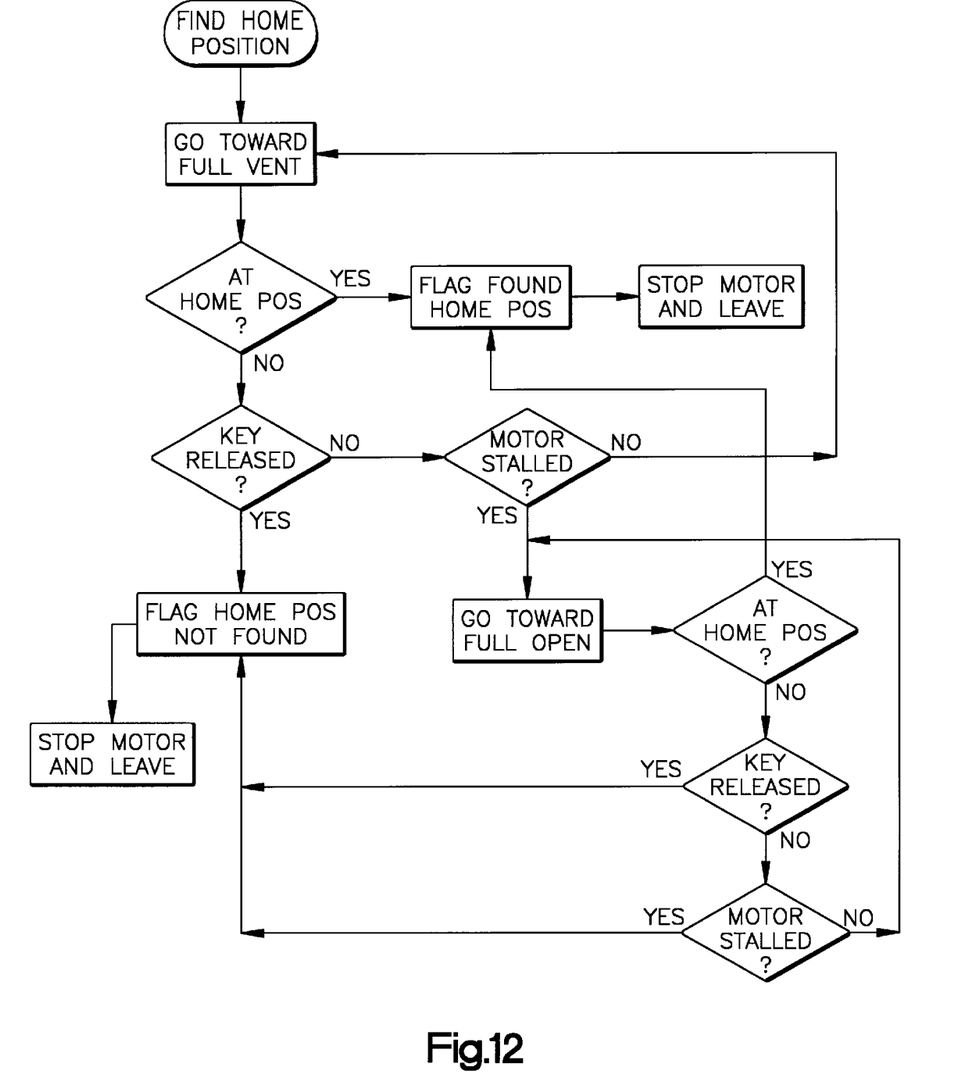

The size of the sunroof is recorded in the following manner: The ignition is turned off and within five seconds the Open key is pressed and the ignition is brought back on. The controller 22 attempts to find the home or park position by means of a routine depicted in FIG. 12 and then proceeds to find the limit of the open area of the sunroof, i.e. the fully open position. When a stall condition is sensed 100 the size of the sunroof open area (in motor generated pulses) is recorded 102 and the controller reverses the direction toward 104 the park position. The controller then finds the limit of the vent area by driving the sunroof toward the fully vented position until a stall condition is sensed 106. In the presently preferred embodiment of the invention, a stall condition mans a motor current of 180 on the unitless current input scale. If it is not possible to perform the calibration due to a failure to find the park position, no information is recorded and the sunroof operation is disabled.

Operating System Overview

Figure 2:
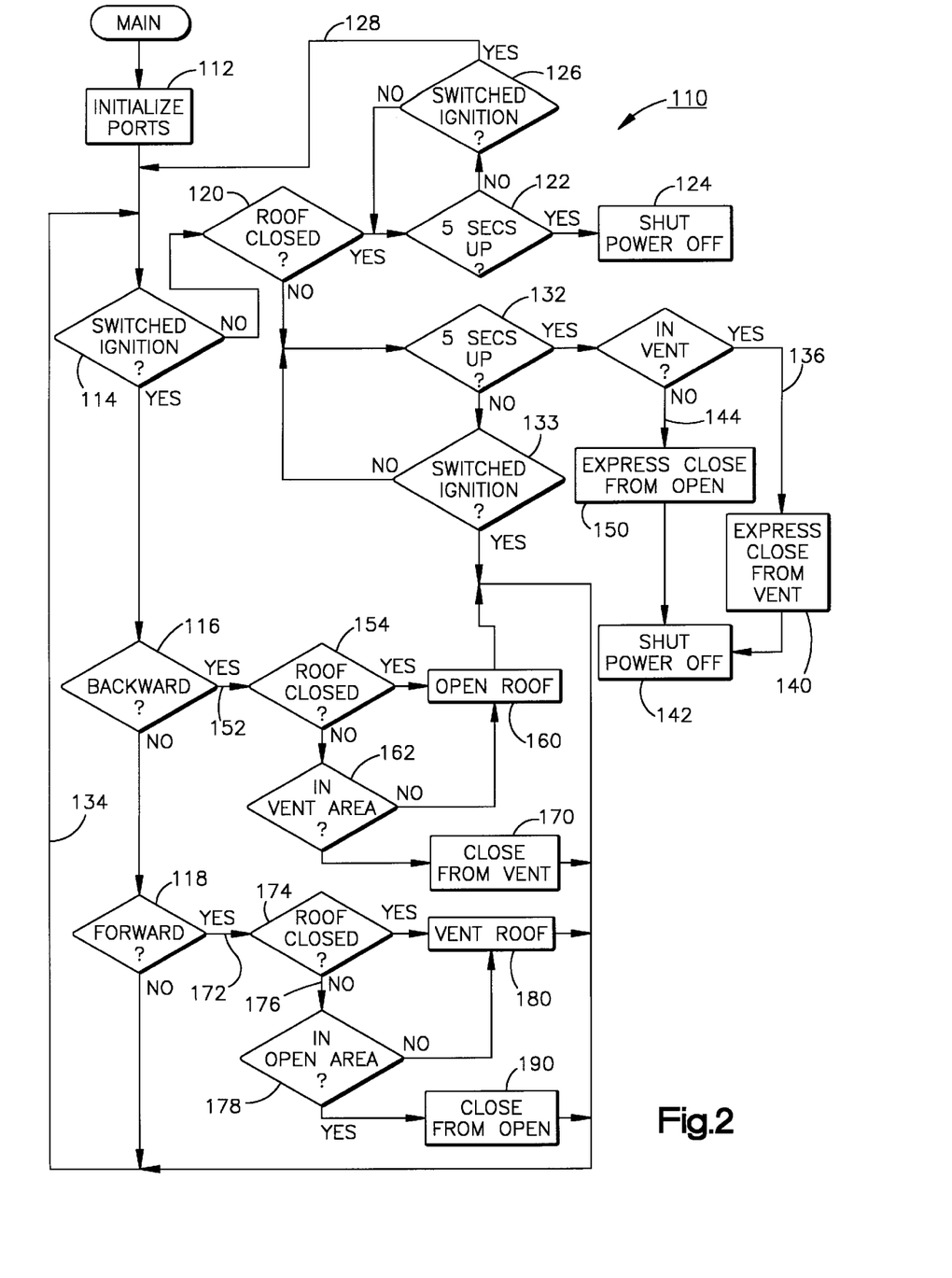
FIGS. 2–12 are flow charts of a control program for a programmable controller that forms part of the power window or panel control circuit.

FIGS. 2–12 depict a flow diagram of the control operating system that the controller implements. Turning to FIG. 2, this figure illustrates a main processing loop 110 that the microprocessor 22 executes until a control input causes the microprocessor 22 to exit the loop. An entry point to the main processing loop starts upon power up of the microprocessor 22 where the program initializes 112 the processor and this includes the step of initializing the I/O ports. The rest of the main processing loop performs the steps of checking to see if the ignition input has been switched off 114, or testing to see if the rocker switch has been actuated by the user to move the sunroof back 116 or forward 118. Note, moving the sunroof back is equivalent to closing the sunroof if the sunroof is in the vent position.

If the ignition is off, the user could be leaving the car or remain sitting in the car with no intent to open the sunroof. The program checks to see if the sunroof is closed 120 by checking the input 72 controlled by the limit switch that indicates the roof is in the home position. If the roof is closed, the controller waits five seconds 122 and powers down the sunroof 124 by removing the sustaining signal on the diode 60. Note, that while the processing is testing 122 if five seconds has elapsed the user could turn the ignition switch on so the program checks 126 for this and if it occurs the program returns to its main loop by a branch 128.

It is also possible that the ignition has been turned off and the roof is not closed. This condition causes the program to branch 130 and check to see if five seconds elapses 132. During this check 132, if the ignition is switched on the program senses 133 this condition and follows a branch 134 back to the main processing loop. If the five seconds expires and the sunroof is in the vent position, the program branches 136 to close the vent 140 in express mode (FIG. 8) and then shuts off the power 142. If the sunroof is in the opened in the non-vent position a branch 144 causes the program to execute an express close from open routine (FIG. 7) 150 and then shut down power to the control circuit 10.

If the ignition is not switched off, the program 110 performs the test of seeing if either of the inputs 66, 68 has been grounded by the user actuating the toggle switch. If the input 68 is low the program branches 152 to check 154 if the roof is closed. If the roof is closed the program opens 160 (FIG. 3) the sunroof and returns by the branch 134 to the main processing loop. If the roof is not closed the program branches to check 162 if the roof is in the vent area. This is done by checking the EEPROM to find the sunroof position. If the program determines the sunroof is in the vent area a close from vent routine 170 is executed and when the program returns from that routine it returns to the main processing loop by the branch 134.

If the ignition is not switched off, and the input 66 is low, the program branches 172 to see if the roof is closed 174. If the roof is closed, a vent roof routine 180 is performed and the program returns to the main processing loop. If the roof is not closed, a branch 176 is taken to determine 178 if the roof is in the open area (checking the EEPROM) and if the roof is in the open area, a close from open routine 190 (FIG. 5) performed before branching back to the main loop by the branch 134.

Figure 3:
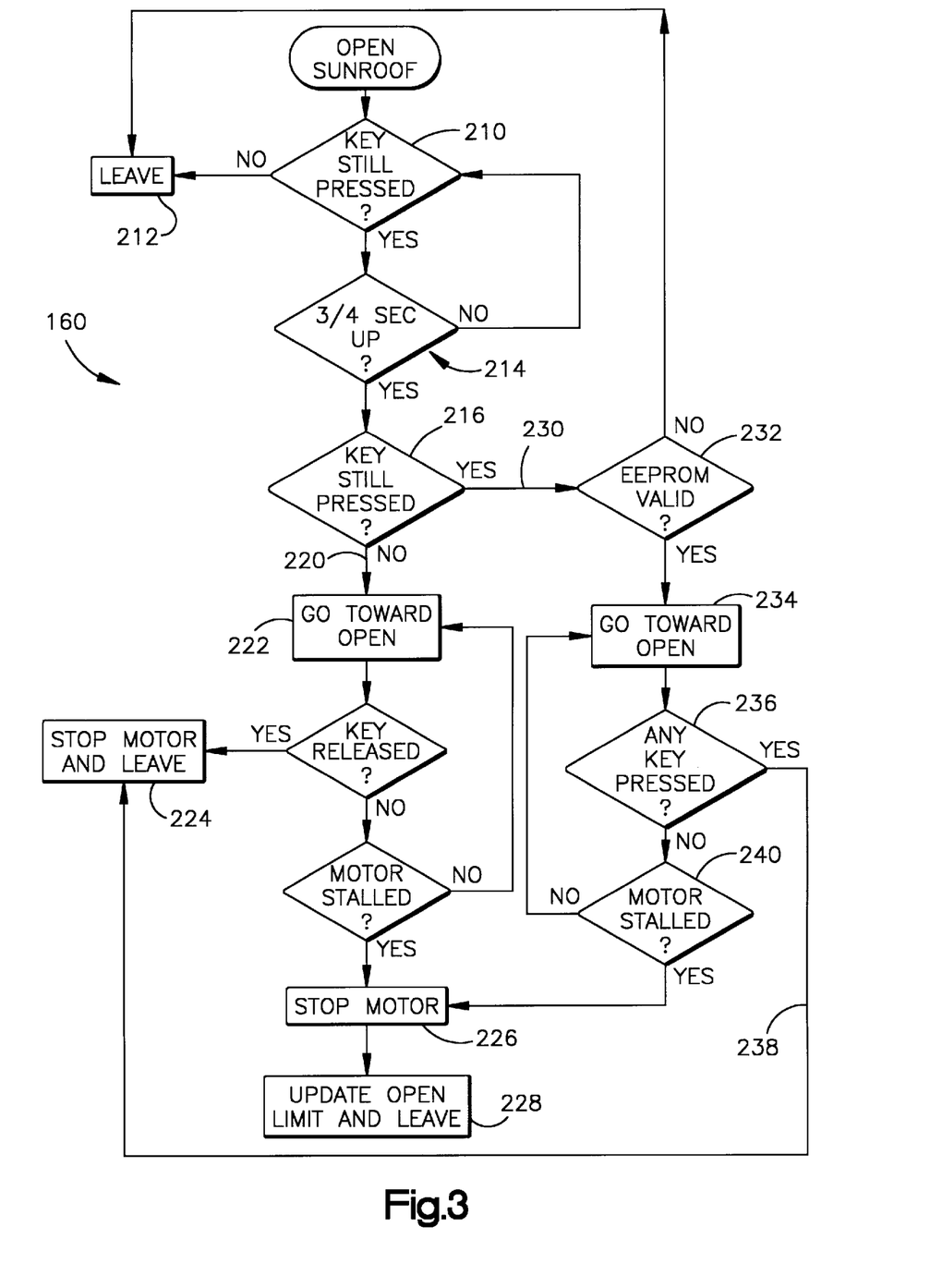

Flowcharts for the routines 140, 150, 160, 170, 180, 190 are depicted in FIGS. 8,7,3,6,4, and 5 respectively. Turning to FIG. 3, this figure depicts the steps the microprocessor 22 performs in opening the sunroof 160. The first step 210 is to check if the input 68 is still low. If it is not, the initial sensing may have been due to noise and the program returns 212 from the routine 160. If the input 68 is still low, the program waits in a loop 214 for ¾ second and again checks 216 the input 68. If the user temporarily actuates the rocker switch for less than ¾ second, the user wants to perform an express open. If the user actuates the switch for greater than ¾ second the control is in manual mode.

Assume manual mode. A branch 220 is taken and the microprocessor activates 222 the motor to open the sunroof. The sunroof continues to open until either the input 68 goes high indicating the rocker switch was released or that the motor has stalled and therefore the sunroof been fully opened and has reached it's end of travel limit. If the toggle switch was released the motor is stopped 224 and the microprocessor 22 leaves the routine 160. If the motor stalls the motor is stopped 226 and the EEPROM position indicating the sunroof end of travel is recorded 228 before the microprocessor 22 leaves the routine 160.

Figure 4:
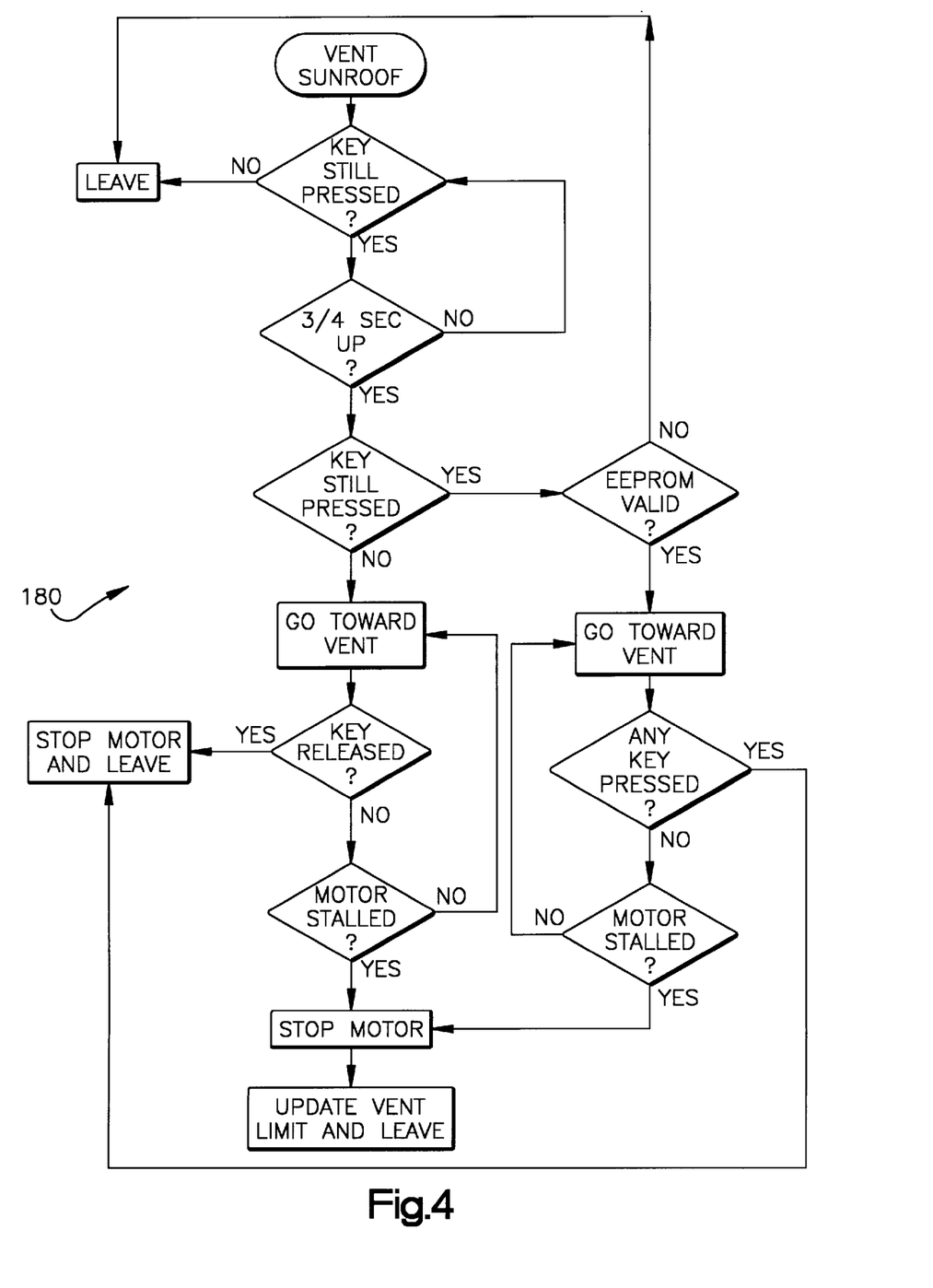

If the user momentarily has pressed the rocker switch indicating an express open is desired a branch 230 is taken and EEPROM is checked 232 to see if a valid sunroof position is stored in the EEPROM. If there is not a valid position in the EEPROM, the program returns 212. If the EEPROM is valid, the program activates the motor 234. As the motor runs, the program checks 236 to see if a key is depressed. If the user has depressed a key indicating the user wishes to end the express open, a branch 238 causes the motor to stop 224 and the routine is exited. If a key has not been pressed, a test is made 240 to see if the motor has stalled. This is an indication that the sunroof has reached an end of travel so a branch is taken 242 to stop the motor 226 and update 228 end of travel position. FIG. 4 is analogous to FIG. 3 except that the routine 180 outlined in the FIG. 4 flowchart is for venting the sunroof and is accessed from a different part of the main control loop of FIG. 2.

Figure 5:
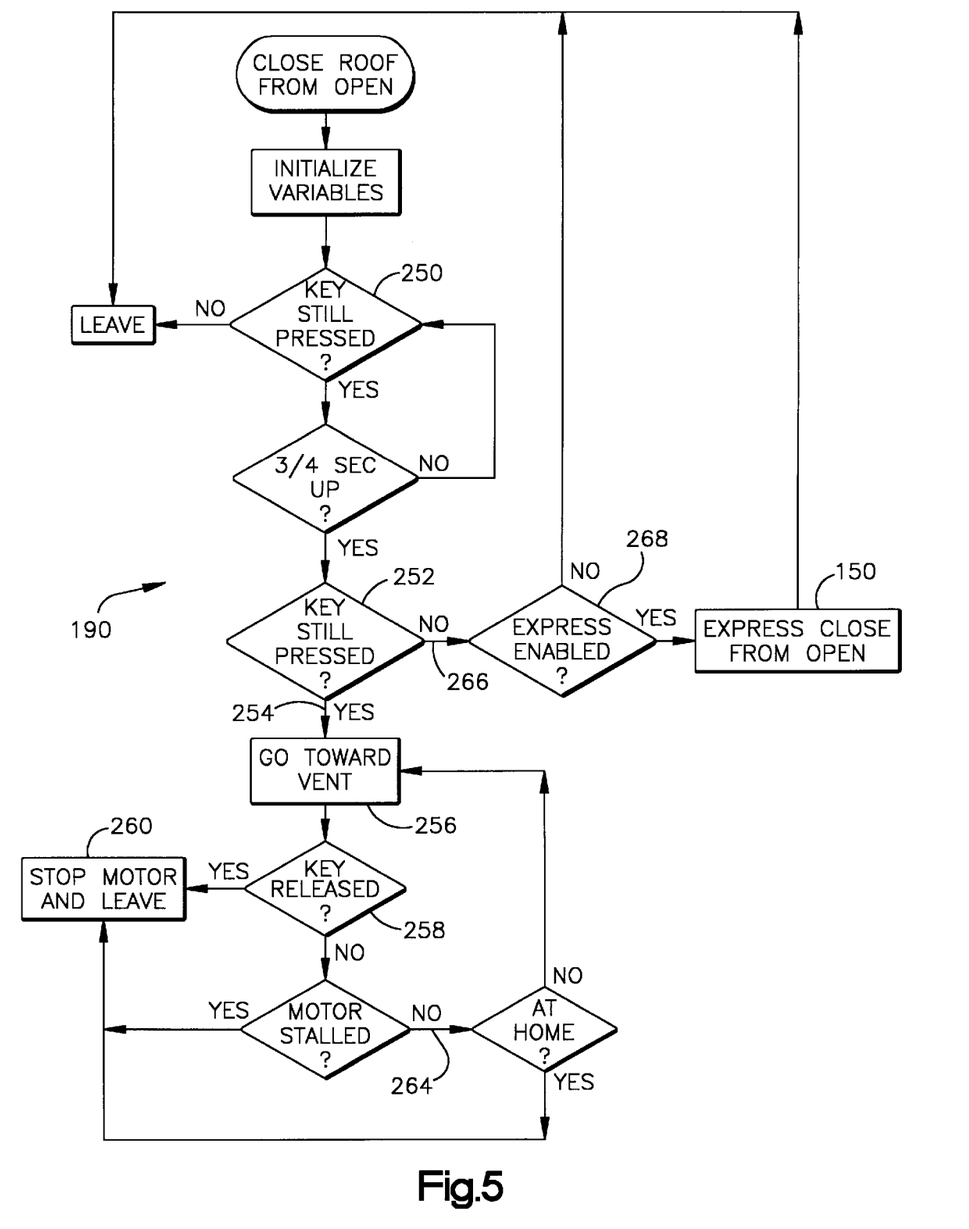
Figure 6:
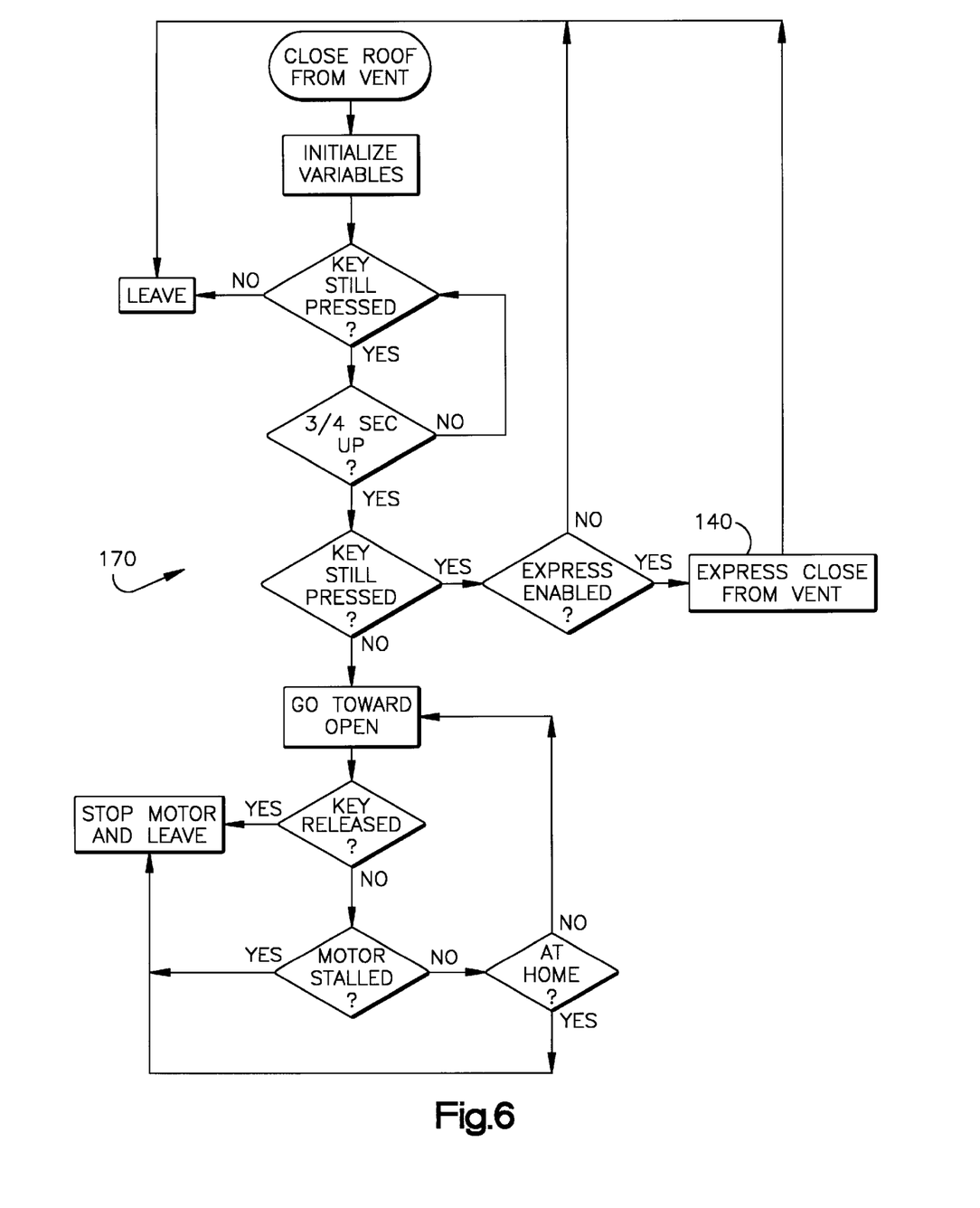

FIG. 5 is a flowchart of a routine 190 for closing an open sunroof from a position either fully or partially opened. A first test 250 determines that the input is still active to avoid false closing due to noise. The program then tests 252 to see if the user has requested an express or manual mode of closing the sunroof. If the user has actuated the rocker switch for longer than ¾ second the microprocessor assumes manual mode and a temporary actuation of less than ¾ second is an express mode. In manual mode a branch 254 is taken and the motor M is activated 256 to close the sunroof. The microprocessor then checks 258 to see if the user has released the switch and if so the motor is de-energized 260 and the routine 190 exited.

If the switch has not been released the microprocessor 22 determines 262 if the motor has stalled. There are certain operating conditions where the motor is unable to move the sunroof to the home condition. At low battery voltage or due to other physical conditions, the motor may not be able to close the sunroof with the result that the motor may be overheated. To avoid this condition, if the motor has stalled, the motor is de-energized 260 and the routine is exited.

If the motor has not stalled, a branch 264 is taken to determine if the motor has driven the sunroof to the home position, and if so the motor is stopped 260 and the routine is exited. If the motor is not stalled and the sunroof is not in the home position the manual sunroof closing continues.

Figures 7, 8:
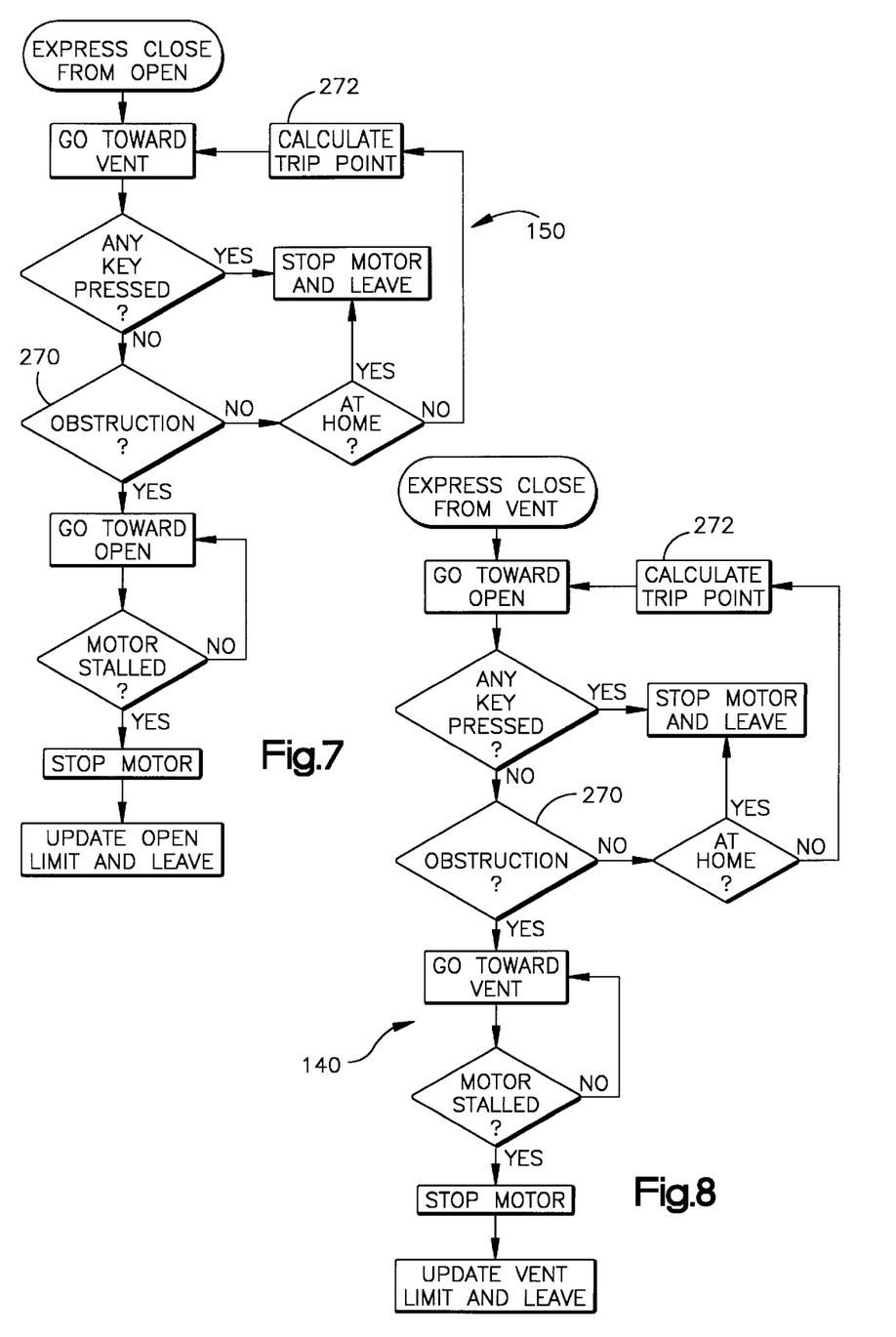

Now assume the switch was depressed less than ¾ second. A branch 266 is taken to determine 268 if express mode flag in the EEPROM is enabled. If so, the microprocessor jumps to a routine 150 for conducting an express close from open. This routine is depicted in FIG. 7. The routine 170 in FIG. 6 for closing the sunroof from the vent position is similar to the routine of FIG. 5, instead of jumping to the routine 150 of FIG. 7, however, this routine branches to a routine for express close from a vent position as depicted in FIG. 8.

FIGS. 7 and 8 are similar in design. If an obstruction is sensed at a decision step 270 the direction of motor actuation is reversed until the sunroof is either fully opened (FIG. 7) or fully vented (FIG. 8). In order to sense an obstruction a so-called trip point must be calculated by both routines at the step 272.

Obstruction Detection

Figure 9:
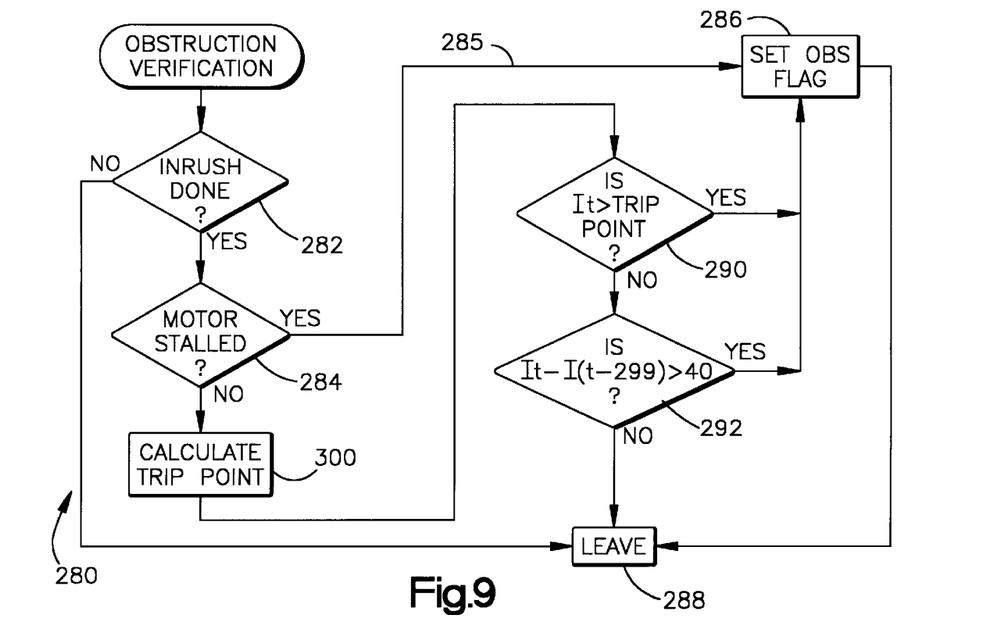

To detect an obstruction when the sunroof panel is closing in its express mode, the controller 22 executes the steps depicted in FIG. 9. Briefly, the microprocessor measures the motor current and compares the sensed motor current with a history of motor current stored in the memory of the controller. When the sensed current and pulse width of the signal at pin 13 causes a calculated threshold to be exceeded an obstruction is assumed and the sunroof is brought back to its full open or full vent position (See FIGS. 7 and 8).

FIG. 9 depicts the obstruction verification routine 280 which begins with a delay 282 during which no obstruction detection can occur. This delay of about 150 milliseconds is to allow motor current to stabilize during the period just after the motor is energized. After this delay, the routine 280 checks 284 to see if the motor has stalled. If it has, a branch 285 is taken and an obstruction flag is set 286 before the controller exits 288 the routine 280. If the motor has not stalled a trip point calculation routine 300 is performed (FIG. 10) and two tests 290, 292 are performed. A first test 290 is for a hard obstruction and a second test 292 is for a soft obstruction.

Figure 10:
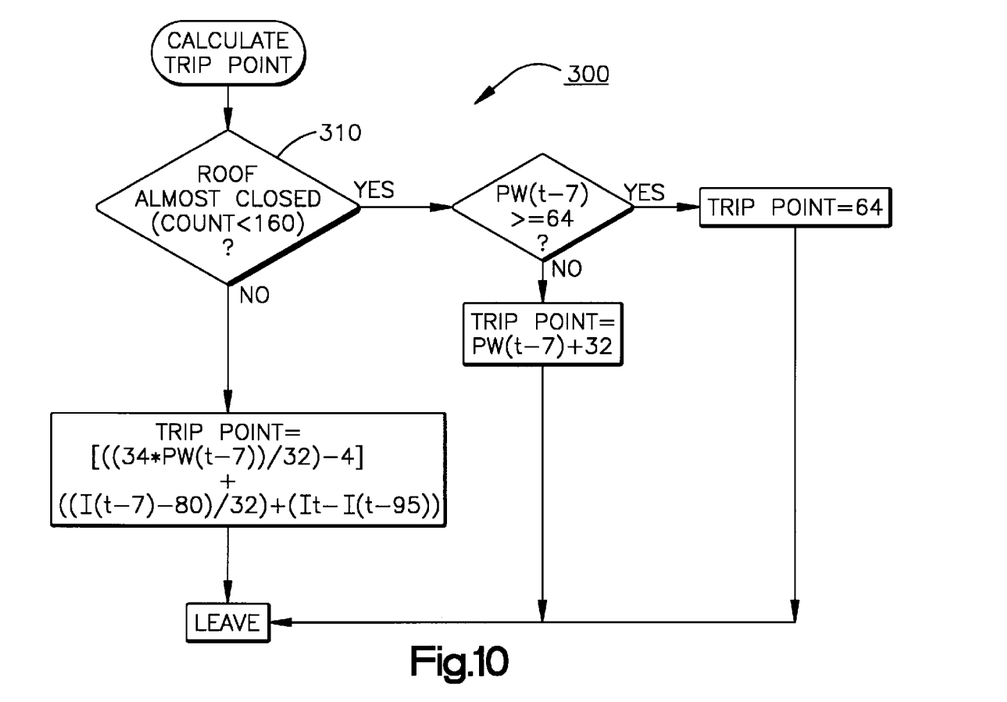

FIG. 10 is a flowchart depicting the steps 300 for calculating a new threshold or trippoint to indicate an obstruction has been sensed. A first decision step 310 determines if the sunroof is almost closed. This is indicated by the roof being within so many counts of the home or closed position. In the region of the home position the sunroof must be moved over a seal or gasket that prevents the sunroof from leaking. At this position the motor is forced to work harder to close the sunroof so that the motor current rises. In this region, is would be difficult to get a hand between the closing sunroof edge and the sunroof opening.

At a next step a test is made 312 to see if the pulse width was greater than 64 a few pulses earlier $PW_{t-7}$. If so, the trippoint is set to 64 and the routine is exited 314. Otherwise, the trip point is set to $PW_{t-7}+32$ (in arbitrary units) and the routine exited. Thus, even at the point of closure of the sunroof there is still an obstruction detection but one not as sophisicated as the one described during normal sunroof movement.

Figure 13:
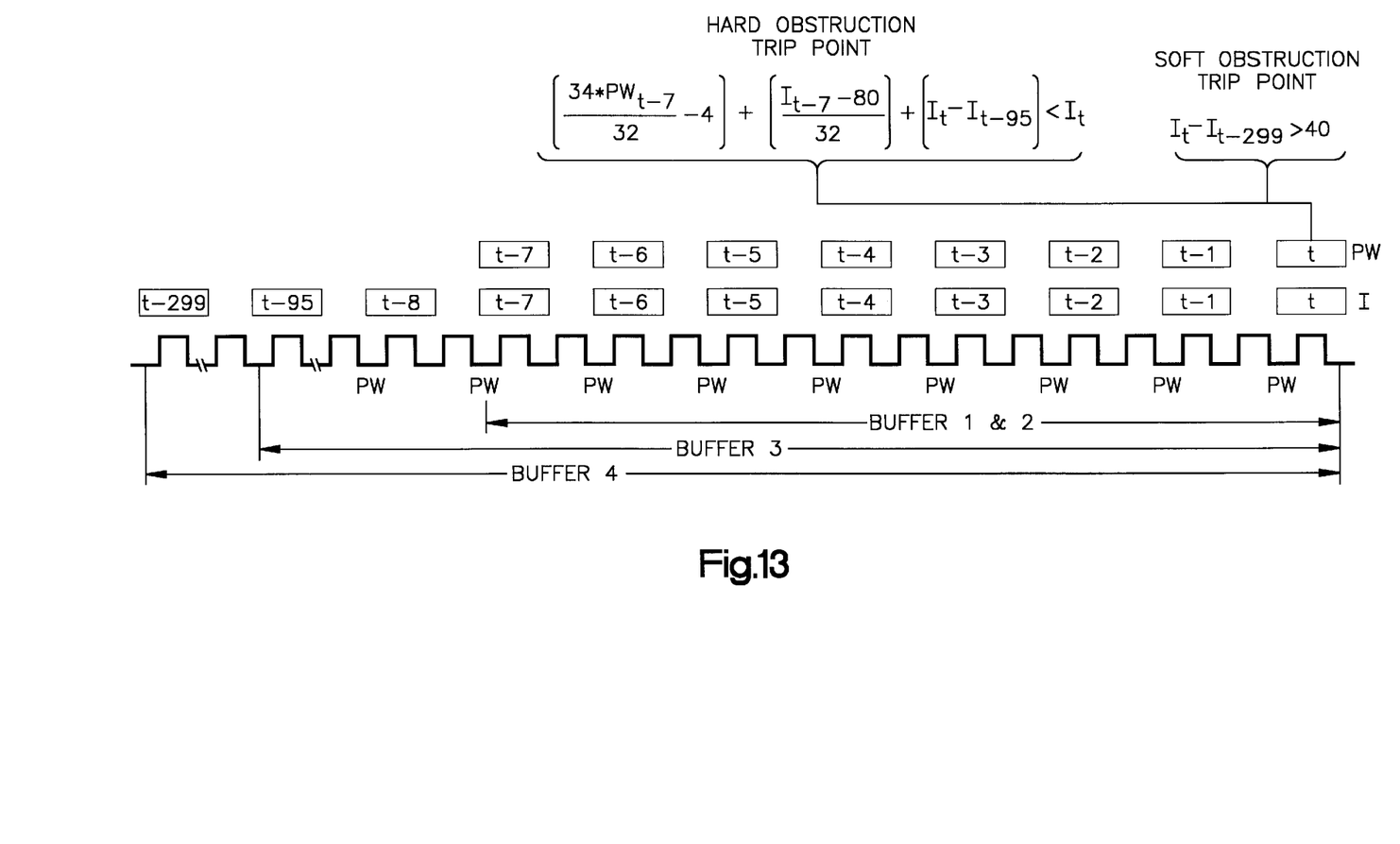
FIG. 13 is a diagram of motor induced pulses that are used during evaluation of the operation of the power window or panel control circuit and more particularly are used to sense obstructions in contact with a leading edge of a panel coupled to the motor.

A trippoint calculation 320 depicted in the FIG. 10 flowchart utilizes three different memory buffers that are graphically depicted in FIG. 13 and are used to store information needed to make a decision about an obstruction. If the sunroof has been calibrated and is subsequently placed in the express close mode, the controller 22 uses the contents of these buffers to determine the presence of an obstruction.

A first buffer has 8 bytes of the last values of the motor current recorded at every other pulse generated by the circuit 114. The oldest value in this buffer is used as a template reference to indicate the normal current drawn at a normal speed without adapting to an obstruction.

A second buffer has 8 bytes of the last values of the noise pulse width recorded at every other pulse.

A third buffer has 8 bytes of current values recorded at every 12th pulse.

The trip point or threshold for determining the presence of a "hard" obstruction is calculated from a combination or summation of three factors:

factor one=$[(34*PW_{t-7})/32]-4$, where $PW_{t-7}$ is the oldest value of the pulse width recorded in the second buffer, i.e. 16 pulses behind the presently sensed pulse.

factor two=$[(I_{t-7}-80)/32)$, where $I_{t-7}$ is the oldest value recorded in the first buffer.

factor three=$(I_t-I_{t-95})$, where $I_{t-95}$ is the oldest current data in the third buffer.

If the presently sensed motor current value becomes greater than the sum of these three factors a hard obstruction is assumed (See FIG. 9) and an obstruction flag is set 286.

The three factors that make up the trip point calculation are based upon empirically obtained evidence of use of the disclosed sunroof controller under a number of operating conditions.

The pulse width time period is an indication of sunroof speed. As the speed increases the factor that utilizes pulse width (PW) causes an obstruction indication more easily than at low speed. Stated another way, the threshold is made to be close to the operating current since there is a shorter time to react to the occurrence of an obstruction. The other two factors are related to motor current. The third factor avoids obstruction sensing for sharp current increase which would otherwise cause an obstruction detection but are due to spurious short lived currents. Nominal values for $I_t$ are from 40 to 80. These do not correspond to units of amperes of milliamperes, but are instead arbitrary values based upon the circuitry (FIGS. 1A, 1B) used to sense the motor current.

A fourth buffer has 6 bytes of current (I) values recorded at every 50th pulse. If the difference in current in the last 300 pulses $(I_t-I_{t-299})$ is larger than 40, it is assumed that the current is on a slow but high surge in value. Thus it is considered that a soft obstruction is present.

While the present invention has been described with a degree of particularity it is the intent that the invention include all alterations and modifications from the disclosed design falling within the spirit or scope of the appended claims.

We claim:

1. Apparatus for controlling activation of a motor for moving a window or panel along a travel path and de-activating the motor if an obstacle is encountered by the window or panel comprising:
   a) a current sensor for sensing the motor current as the motor moves the window or panel along a travel path and producing a speed signal indicative of motor speed;
   b) a switch means for controlling energization of the motor with an energization signal; and
   c) a controller coupled to the switch means for controllably energizing the motor comprising:
      i) means for monitoring motor current from the sensor;
      ii) means for monitoring motor speed based on the speed signal;
      iii) means for calculating an obstacle detect threshold based on motor current detected during at least one prior period of motor operation and motor speed detected during at least one prior period of motor operation;
      iv) a comparator for comparing a value based on currently sensed motor current with the obstacle detect threshold; and
      v) output means coupled to said switch means for stopping the motor if the value based on currently sensed motor current exceeds the obstacle detect threshold by a predetermined amount.

2. The apparatus of claim 1 wherein the controller comprises a stored program programmable controller including an interface for coupling to a position sensor to determine a home position as the panel or window is moved by the motor and wherein the programmable controller conducts a calibration sequence by moving the window or panel to its home position.

3. The apparatus of claim 2 wherein subsequent to the calibration sequence the programmable controller determines a position of the window or panel relative to the home position and wherein the controller counts pulses generated as the motor commutates during rotation of an output shaft coupled to the window or panel through a transmission.

4. The apparatus of claim 1 further comprising means for determining a stalled condition of the motor based upon sensed motor current.

5. The apparatus of claim 1 additionally comprising a rain sensor for generating a signal input to the controller for automatically closing the panel or window.

6. The apparatus of claim 1 wherein the controller comprises a stored program programmable controller which maintains values of motor current for use in calculating the obstacle detect threshold.

7. The apparatus of claim 6 wherein the programmable controller maintains values of the motor speed for use in calculating the obstacle detect threshold.

8. The apparatus of claim 6 wherein the programmable controller includes a signal interface for routing user inputs to the controller and further comprising a user actuated switch for creating one input to the signal interface to initiate motion of the window or panel in one sense and for creating a second input to the signal interface to initiate motion of the window or panel in an opposite sense, said controller comprising a timer for determining how long the user has actuated the switch and for activating the motor in either of two modes based on the sensed time.

9. The apparatus of claim 8 wherein the programmable controller comprises a control program that allows the user to override obstruction sensing performed by the controller to close the window or panel.

10. The apparatus of claim 1 additionally comprising limit switches for defining locations along a path of travel of the window or panel for use by the controller.

11. The apparatus of claim 1 additionally comprising a power switch for energizing the controller and further comprising circuitry to temporarily maintain power to the controller after the power switch is opened.

12. The apparatus of claim 11 wherein the window or panel is a moveable member of a motor vehicle and the power switch is the motor vehicle ignition switch.

13. The apparatus of claim 1 wherein the controller calculates the obstacle detect threshold using the motor current detected during two prior periods of motor operation.

14. The apparatus of claim 1 wherein the controller calculates the obstacle detect threshold using the motor current and motor speed detected during prior periods during movement caused by a present actuation of the motor.

15. The apparatus of claim 1 further comprising a position detecting means for detecting whether the window or panel is within a soft obstruction region and wherein the output means stops the motor if the window or panel is in the soft obstruction region and the sensed motor current exceeds prior motor current sensed within the soft obstruction region by a predetermined amount.

16. Control apparatus for use with a power activated sunroof comprising:
 a) a motor that moves a sunroof window or panel along a travel path;
 b) a current sensor coupled to the motor for sensing motor current as the motor moves the sunroof window or panel along a travel path;
 c) switch means for energizing the motor in one of two directions with an energization signal;
 d) a pulse generator for generating signal pulses related to speed of movement during movement of the sunroof window or panel and for generating a pulse generator output; and
 e) a programmable controller including a control program for controllably energizing the motor comprising:
  i) a first input for monitoring motor current from the current sensor;
  ii) a second input for monitoring pulses output by the pulse generator;
  iii) logic for comparing sensed motor current with a factor based upon sensed current and speed that changes with the movement of the sunroof window or panel; and
  iv) an output coupled to said switch means for activating the switch means based upon the results of the comparison to stop movement of the sunroof window or panel.

17. The apparatus of claim 16 wherein the switch means deactivates the motor when the present motor current and motor speed exceeds the factor based upon sensed motor current and motor speed.

18. A method for controlling activation of a motor for moving a window or panel along a travel path and de-activating the motor if an obstacle is encountered by the window or panel comprising:
 a) sensing an initial motor current as the motor moves the window or panel along a travel path and storing a value related to the motor current;
 b) controlling energization of the motor with an energization signal;
 c) monitoring a later motor current sensed during movement of the window or panel and storing a value related to the motor current;
 d) generating pulses related to motor speed from sensed motor current;
 e) determining a threshold factor based on an initial and a later sensed motor current and a motor speed,
 f) stopping the motor if the threshold factor when compared with sensed motor current indicates an obstacle has been detected.

19. The method of claim 18 additionally comprising a step of moving the window or panel to a home or closed position and using the home position and the pulses related to motor speed to determine a position of the window or panel.

20. The method of claim 18 wherein the pulses are generated from a d.c. motor current as the motor commutates during rotating of a motor rotor.

21. The method of claim 18 additionally comprising the step of sensing a user input to override the stopping of the motor in the event of a rise in current indicating an obstruction has been sensed.

22. Apparatus for controlling activation of a motor for moving a window or panel along a travel path and de-activating the motor if an obstacle is encountered by the window or panel comprising:
 a) a current sensor for sensing the motor current as the motor moves the window or panel along a travel path;
 b) a motor speed signal means for producing a signal indicative of motor speed;
 c) a switch means for controlling energization of the motor with an energization signal; and
 d) a controller coupled to the switch means for controllably energizing the motor comprising:
  i) means for monitoring motor current from the sensor;
  ii) means for monitoring motor speed from the signal means;
  iii) means for calculating an obstacle detect threshold based on motor current detected during at least one prior period of motor operation and motor speed detected during at least one prior period of motor operation;
  iv) a comparator for comparing a value based on subsequent sensed motor current with the obstacle detect threshold; and
  v) output means coupled to said switch means for stopping the motor if the value based on subsequent sensed motor current exceeds the obstacle detect threshold by a predetermined amount.

23. The apparatus of claim 22 wherein said motor speed signal means is a hall effect sensor which produces pulses based upon motor rotation.

24. An apparatus for controlling activation of a motor for moving a window or panel along a travel path and de-activating the motor if an obstacle is encountered by the window or panel comprising:
 a) a current sensor for sensing the motor current as the motor moves the window or panel along a travel path;
 b) a switch means for controlling energization of the motor with an energization signal;
 c) a programmable controller coupled to the switch means for controllably energizing the motor comprising:
  i) means for monitoring motor current from the sensor and determining motor speed;
  ii) a first memory for storing prior values of motor current sensed during a first prior period;
  iii) a second memory for storing prior values of motor current sensed during a second prior period;
  iv) means for calculating an obstacle detect factor based on the prior values of motor current stored in said first and second memories and sensed motor speed; and
  v) a comparator for comparing the obstacle detect factor with an obstacle detect threshold; and
  vi) output means coupled to said switch means for stopping the motor if the obstacle detect factor exceeds the obstacle detect threshold.

25. A method for controlling activation of a motor for moving a sunroof along a travel path and de-activating the motor if an obstacle is encountered by the sunroof comprising:
 a) sensing the motor current as the motor moves the sunroof along a travel path;
 b) generating pulses related to motor speed;
 c) controlling energization of the motor with an energization signal;
 d) monitoring motor current sensed during movement of the sunroof and comparing sensed motor current with a prior motor current sensed at a prior period of motor operation;

e) stopping the motor if the sensed motor current exceeds a threshold factor determined from prior sensed motor current by a predetermined amount;

f) moving the sunroof to a home or closed position and using the home position and the pulses related to motor speed to determine a position of the sunroof;

g) monitoring the opening and closing of the sunroof wherein the actuation of the motor opens the sunroof or vents the sunroof depending on the sense of motor current; and h) sensing user input to determine a mode of opening or closing the sunroof in either a manual or express mode and wherein the controller only monitor obstructions in a path of movement of the sunroof in the express mode of closing the sunroof.

26. A method for controlling activation of a motor for moving a motor vehicle window or panel along a travel path and de-activating the motor if an obstacle is encountered by the window or panel comprising:

a) controlling energization of the motor by outputting an energization signal from a programmable controller powered by a motor vehicle battery;

b) sensing a motor current input to the programmable controller as the motor moves the window or panel along a travel path;

c) monitoring motor current sensed during multiple intervals of window or panel movement;

d) generating pulses related to motor speed from sensed motor current; and e) stopping the motor if the sensed motor current and the motor speed causes a threshold factor based on said sensed motor current and said motor speed to indicate an obstacle has been encountered; and f) sustaining power to the programmable controller for a short period of time after a vehicle ignition switch is turned off to control a closing of the window or panel subsequent to the turning off of the ignition switch.

* * * * *